Feb. 1, 1955 C. A. LOVELL ET AL 2,701,279

MULTIFREQUENCY SIGNALING SYSTEM

Filed Oct. 21, 1953

INVENTORS C.A. LOVELL
J.H. McGUIGAN
BY [signature]

ATTORNEY 2,701,279
Patented Feb. 1, 1955

2,701,279

MULTIFREQUENCY SIGNALING SYSTEM

Clarence A. Lovell, Summit, and John H. McGuigan, New Providence, N. J., assignors to Bell Telephone Laboratories, Incorporated, New York, N. Y., a corporation of New York Application October 21, 1953, Serial No. 387,436

4 Claims. (Cl. 179—90)

Figures 1, 2:
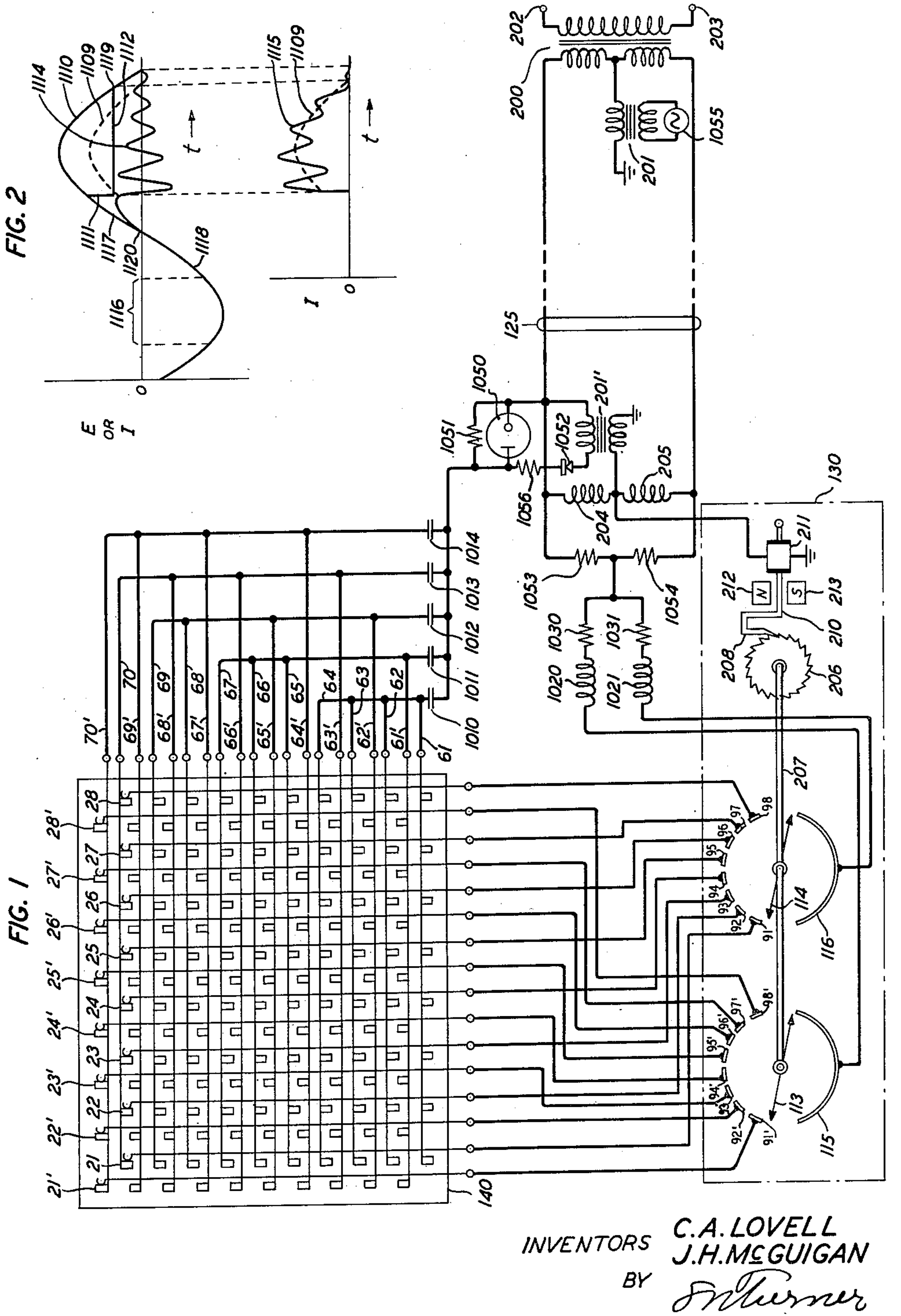

This invention relates to apparatus and equipment for high speed multifrequency signaling to be used in connection with telephone and other signaling and calling systems.

More specifically, this invention relates to improvements in the resonant circuit configurations employed to generate multifrequency signals for transmission to a central switching point as disclosed in the copending application of C. A. Lovell and O. J. Murphy, Serial No. 357,858, filed May 27, 1953, and allowed September 24, 1954.

In a broader sense, this invention relates to improved calling arrangements suitable for use in combination with receiving apparatus and equipment disclosed in Patent 2,658,189 issued November 3, 1953, to C. A. Lovell, which discloses multifrequency signaling and receiving arrangements wherein five different voice frequency signals taken two at a time are employed to represent ten different digits, any one of which may be used to identify one symbol or number in a called subscriber's number or identifying code. Similar types of signals are employed in the exemplary embodiment of the invention set forth in the present disclosure. Of course, it is not necessary to employ voice frequencies as long as the frequencies employed are high compared to the frequency of the alternating-current supply voltage transmitted over the subscriber's line to actuate the signaling system.

An object of the present invention is to improve the circuitry associated with the polytonic high-speed calling signal generator as disclosed in the above-identified allowed application of Lovell and Murphy. Said improvements reduce the number of complete resonant circuits needed from five to two with a resultant reduction in the number of electronic components required, and, concomitantly, a decrease in the physical size of said signaling system.

A feature of this invention is the use of two inductor-resistor series circuits and five capacitors, selectable two at a time in series with said inductor-resistor circuits for forming two series resonant circuits capable of being shock excited in order to furnish a multifrequency signal representing one of the ten digits corresponding to one symbol or number in the called subscriber's number or identifying code.

More particularly, a feature of the invention relates to the use of two stepping switches and a plurality of selector switches and pairs of conductors associated with each selector switch and corresponding contacts on the stepping switches for selectively connecting pairs of capacitors to the two inductor-resistor series circuits to form ten series resonant circuits, a source of control voltage of alternating polarity, electromechanical means responsive only to one polarity of the control voltage for operating the stepping switches concurrently, circuit means responsive only to the opposite polarity of the control voltage to apply to a selected pair of series resonant circuits a pulse of electrical energy sufficient to shock excite the resonant circuits according to the instant position of the stepping switches, and circuit means for applying the damped alternating currents generated in the series resonant circuits to a signaling line.

The invention may be more readily understood from the following description when read with reference to the drawings in which:

Fig. 1 shows the manner in which the selector switch, the stepping switch, the resonant circuits, the shock exciting gas tube, and other related equipment are interconnected and cooperate with one another to form an improved exemplary signaling system in accordance with this invention; and Fig. 2 is a graph showing the manner in which the equipment performs in response to an applied alternating-current voltage wave form.

Referring to the system drawing shown in Fig. 1 the selector switch is represented by 140 while the distributor device or stepping switch is identified as 130. These two devices are disclosed and described in more detail in the Lovell and Murphy application, Serial No. 357,858 above.

The selector switch 140 can be positioned by eight manual selector dials or switches, or some other manual method or means (not shown), each of which corresponds to one digit or one numeral of the called subscriber's telephone number or identifying code. Two contact members are associated with each manual selector dial so that two of the five frequencies may be simultaneously selected. These pairs of contact members are designated 21, 21'; 22, 22'; . . . ; 28, 28'. Contact members 21 through 28 are associated with bus bars 61 through 70, while contact members 21' through 28' are associated with bus bars 61' through 70'. By properly setting each of the eight manual selector dials or the contact members associated with each, the two frequencies that have been chosen to represent a particular digit or numeral in a called subscriber's number or identifying code can be connected through the selector switch 140 over a pair of conductors to the corresponding terminals or step contacts of the stepping switch 130. The contact members 21 through 28 and 21' through 28' of the selector switch 140 are directly connected over respective pairs of conductors respectively to step contacts 91 through 98 and 91' through 98' of the stepping switch 130. Thus in the first manual selector dial, contact member 21, associated with stepping switch contact 91, is bridged to one of the bus bars 61 through 70 and contact member 21', associated with stepping switch contact 91', is bridged to the corresponding bus bar 61' through 70', depending upon the two frequencies that have been chosen to represent the first digit or numeral of the called subscriber's telephone number. In a similar manner the other seven digits or numerals of a subscriber's number can be bridged to the proper bus bars.

The stepping switch 130 comprises two brushes or wiper contacts 113 and 114 moving over the group of step contacts 91' to 98' and 91 to 98 respectively while simultaneously making contact with contacts 115 and 116 respectively. The brushes 113 and 114 are driven by a ratchet wheel 206 through a shaft 207. The ratchet wheel 206 is driven by a stepping pawl 208, which is attached to a magnetic reed armature 210. The magnetic structure is polarized by north permanent magnet 212 and south permanent magnet 213 and the magnetic reed armature 210 is actuated by the coil 211.

The subscriber's calling line 125 extends to a distant point, e. g. a central office, where a source of alternating current 1055 is coupled to the line through a transformer 201. The alternating current is supplied through the isolation transformer 201 to both subscribers' or calling line conductors through the center tap of the primary winding of a line transformer 200 and to ground. Similarly, at the calling subscriber's station the primary winding of a second transformer 201' is connected between the center point of winding or simplex coils 204 and 205 and ground. One side of the secondary of this transformer 201' is connected to one side of the subscriber's line 125, to one terminal (the cathode) of the gas discharge tube 1050, and to one terminal of resistor 1051. The other terminal of the secondary of transformer 201' is connected through a rectifier or diode 1052 and a resistor 1056 to the other terminals of the tube 1050 and the resistor 1051.

The rectifier or diode 1052 may be a crystal rectifier such as silicon or germanium, a selenium rectifier, a high vacuum rectifier or diode or any other suitable type of rectifier which presents to current flow a low impedance when polarized in one direction and a high impedance when polarized in the opposite direction. It is understood that when the arrow terminal is negative with respect to the other terminal, the diode represents a high impedance or effectively an open circuit to current flowing in the direction of the arrow. Conversely, when the arrow terminal is positive with respect to the other terminal, the diode represents a low impedance or, for all practical purposes, a short circuit to current flowing in the direction of the arrow.

The subscriber's or calling line conductor which is connected directly to one side of the secondary of transformer 201' is also connected to the upper side of the winding 204 and to the resistor 1053. The other calling line conductor is connected to the lower side of the winding 205 and to one side of the resistor 1054. The remaining terminals of the resistors 1053 and 1054 form a common point electrically which connects to the resistors 1030 and 1031. The other terminals of the resistors 1030 and 1031 connect to the inductances 1020 and 1021, respectively, which in turn are connected to the stepping switch contacts 115 and 116, respectively. These two connections then extend through the stepping device 130 by means of the brushes or wiper contacts 113 and 114, through the selector switch 140 and selectively to two of the condensers 1010, 1011, 1012, 1013, and 1014. The other side of all these condensers is a common point electrically and terminates at the left side (the anode) of the gas discharge tube 1050.

Two of these five condensers are bridged, selectively, to the appropriate position on the stepping switch 130 by the setting of any one of the manual selector dials or switches. As a result, the circuit including one of the selected condensers in series with inductance coil 1020 and resistor 1030 forms one of the two resonant circuits required, while the circuit including the other selected condenser in series with inductance coil 1021 and resistor 1031 forms the other resonant circuit.

It will be apparent to those who have worked on the development of subscriber telephone sets and substation circuits that a reduction in the number of components that have to be encased within the shell of a subscriber's set constitutes an improvement of the first order. Not only is such reduction financially advantageous since many thousands of subscribers' sets are produced, but it also saves space which is at a premium in the present-day subscriber set. Consequently, any circuit or component simplification which can be effected without interfering with the proper functioning of the subscriber set and its associated circuitry is important.

Upon the initiation of a call, the equipment at the subscriber's station will be conditioned and connected as shown in Fig. 1 of the drawings. Also, the equipment at the central station will apply to the subscriber's line a source of alternating current 1055. In the exemplary embodiment of this signaling system the frequency of alternating current 1055 is 45 cycles per second. In addition, a call signal receiver will be connected to the subscriber's line in any suitable manner, e. g. to the terminals 202 and 203 of the coupling transformer 200.

Switching equipment at the subscriber's station suitable for use with this signaling system is disclosed in Patent 2,598,695 issued June 3, 1952 to Hill and Parkinson, and in Patent 2,672,523 issued March 16, 1954 to Dunlap and Malthaner. Suitable switching equipment at the central station is disclosed in Patent 2,655,559 issued October 13, 1953 to Malthaner and Vaughan. Of course, the receiver employed in such over-all systems must be designed to cooperate with the particular multifrequency signals generated by the signaling system at the calling subscriber's station.

In the embodiment of this invention shown in Fig. 1 the alternating current for energizing the stepping switch coil 211 is supplied from the common connection of the windings 204 and 205. The armature 210 is mounted along the line-of-centers of the coil 211, and, consequently, will not move when the coil 211 is energized unless the oppositely polarized permanent magnets 212 and 213 are present.

This will be apparent when it is remembered that magnetic lines of flux build up to a maximum value at the center of a coil regardless of the polarity of an armature within the coil. If the armature lies along the line-of-centers of the coil, the forces set up when the coil is energized will cancel one another out and the armature will not move. On the other hand, if the armature is mounted off the line-of-centers, the electromagnetic forces generated by the coil will always tend to pull the armature toward the center and it will oscillate at twice the frequency of the alternating current applied to the coil.

However, with the armature 210 lying along the line-of-centers and permanent magnets 212 and 213 present, when the magnetic reed armature 210 is polarized north by the alternating current flowing through the coil 211, the north permanent magnet 212 repels it while the south permanent magnet 213 attracts it. This causes the armature to move in a downward direction. When the alternating current's phase has shifted 180 degrees, the armature 210 is polarized south. In this case, the north permanent magnet 212 attracts it and the south permanent magnet 213 repels it. This causes the armature to move in an upward direction. Thus, the excursion of the armature above and below its equilibrium position (along the line-of-centers) approximates the excursion in a positive and a negative direction of the alternating current from source 1055 during each complete cycle. Because the pawl 208 is actuated by the armature 210, it travels above and below its equilibrium position at a frequency approximating the alternating-current frequency of the source 1055.

The stepping switch armature 210 is mechanically tuned to approximate the periodicity of the alternating-current source 1055. To do this, the inertia of the armature 210 is minimized so that it will tend to react with no appreciable delay to the electromagnetic force generated by the energization of the coil 211.

The stepping switch's operation is phased with respect to the shock excitation of the resonant circuits. Thus, when the diode 1052 blocks current from flowing through the gas tube 1050 and prevents its breakdown—a condition which occurs on the application of a negative half cycle from alternating-current source 1055—the stepping switch 130 should step. Conversely, when the diode 1052 is effectively short circuited and allows voltage to be applied to the gas tube 1050—a condition which occurs on the application of a positive half cycle from alternating-current source 1055—the stepping switch 130 should not step. This is accomplished by constructing the pawl 208 and the ratchet 206 in such a manner that the ratchet 206 moves only when the armature 210 and the pawl 208 move in a downward direction.

It should be understood, of course, that it would work just as well to advance the stepping switch 130 during the positive half cycle of the applied alternating current and to shock excite the resonant circuit or circuits during the negative half cycle of the applied alternating current. The important thing is that the stepping switch 130 does not step during the same half cycle in which the resonant circuits are being shock excited. In the exemplary embodiment of the invention, the resonant circuits are shock excited during the positive half cycle of the applied alternating current from source 1055 while the stepping switch 130 is made to step during the negative half cycle of the applied alternating current from source 1055.

The applied alternating-current wave form is represented by curve 1118—1117—1110 in Fig. 2. The stepping device 130 is tuned so that the ratchet 206 advances one step during the time interval designated 1116.

Assume for the purpose of explaining the operation of this signal generating circuit that brush arms 113 and 114 are resting in the position shown in the drawing. Also assume that when the alternating current is first applied to the system it will be applied at a time near the beginning of a negative half cycle. The alternating current, of course, may have any phase when it is first applied to the system. Likewise, the brush arms 113 and 114 may be resting in any position when the alternating current is first applied to the system. While the mode of operation is substantially the same in either case, it is more easily explained if these assumptions are made.

In addition, assume that the first digit of the called subscriber's number, e. g. one, is represented by the two resonance circuits comprising first the capacitor 1013, inductance 1021, and resistor 1031 and second the capacitor 1014, inductance 1020, and resistor 1030, respectively. Hence, the first manual selector dial is set on the number one which places contacts 21' and 21 in contact with bus bars 70' and 70, respectively.

During the negative portion 1118 (see Fig. 2) of the applied alternating-current voltage the arrow terminal of the rectifier or diode 1052 is more negative than its other terminal because the right terminal of the secondary of the transformer 201' is arranged to be positive with respect to the left terminal as a result of the negative alternating current impressed upon the primary of the transformer 201' by the alternating current from source 1055. Consequently, the diode 1052 acts as a high impedance, or effectively as an open circuit, to current flow. Thus, no appreciable voltage is applied across the gas tube 1050 or to the condensers 1014 and 1013 of the respective resonant circuits. However, at the beginning of the positive half cycle (designated 1120 on the curve of Fig. 2) the polarity of the rectifier 1052 is reversed and the diode 1052 then acts as a low impedance, or effectively as a short circuit, to current flow. The applied voltage then, in series with resistor 1056 and the short-circuited diode 1052, causes the voltage applied to the condensers 1014 and 1013 of the respective resonant circuits to rise because the voltages across the tube 1050 and the resistor 1051 rise. The resistor 1056 is chosen to equal or slightly exceed the value of critical damping resistance for the tuned circuits included in the over-all circuit. This prevents the rise of the voltage represented by the portion of the curve 1117 from creating any undamped oscillations in the tuned circuits. Further, the voltage rise is sufficiently slow and starts sufficiently near zero, due to the wave form of the applied alternating-current voltage and the operation of the diode 1052, so that the magnitude of the unidirectional current which flows to charge the condensers of the tuned circuits is relatively low.

When the magnitude of the voltage applied across the tube 1050 reaches the breakdown voltage value of the tube 1050, a discharge will be initiated through the tube. The voltage drop across the tube will then abruptly fall to a lower sustaining voltage in accordance with the usual mode of operation of gas discharge tubes. The abrupt change in voltage across the tube 1050 is represented by a line 1111 of Fig. 2 and the sustaining voltage by the horizontal line 1112. As shown by the horizontal line 1112, the sustaining voltage across tube 1050 remains substantially constant until the instantaneous amplitude of the applied alternating-current voltage drops below the sustaining voltage of tube 1050 at 1119. During the discharge time of the tube 1050 its alternating-current impedance is quite low; consequently, the current through the tube tends to follow an alternating-current wave form as illustrated by curve 1109.

The abrupt change in voltage across the tube 1050, depicted at 1111, comprises in effect a "step" wave form or function similar to the wave form generated by a step wave generator, which shock excites the resonant circuits, and, because of the low impedance of the gas tube 1050 during this time, provides a path for the flow of the damped alternating currents of the resonant frequencies through their respective resonant circuits. The circuit paths for the flow of these alternating currents extend from the contacts 115 and 116 of the stepping switch 130, through the brush arms 113 and 114 and the corresponding step contacts 91' and 91 of the stepping switch 130, through the contacts 21' and 21 of the manual selector switch 140, through the capacitors 1014 and 1013 selected for inclusion in the resonant circuits, through the gas tube 1050 and the resistor 1053, through the resistors 1030 and 1031, through the inductances 1020 and 1021, and back to the contacts 115 and 116 of the stepping switch 130. The oscillating alternating current flowing in these circuits as a result of shock exciting the resonant circuits is in the form of a damped alternating-current wave 1114, illustrated in Fig. 2.

Therefore, the total current flowing through the gas discharge tube 1050 is the sum of the current 1109 of the applied alternating current after breakdown and the current 1114 flowing from the resonant circuits. This total current's wave form 1115 is shown on Fig. 2. Although the resonant damped alternating current flowing through tube 1050 has negative half cycles, when it is added to the current from the power source flowing through tube 1050 the combined current at all times remains sufficiently positive to maintain conduction within the tube 1050, as illustrated by curve 1115. The damped resonant current, whose wave form 1114 is shown on Fig. 2, represents only a single frequency. However, in practice, the two frequencies, out of five available, chosen to represent a particular numeral or digit of the called subscriber's identifying code are both present.

The frequency of the alternating-current voltages induced in any one series resonant circuit is controlled by the magnitude of the condenser and the inductor associated with it. The degree and speed of damping the alternating-current voltage wave 1114 is controlled by the resistor in the resonant circuit (resistor 1030 or 1031), the resistance of the coil in the resonant circuit (coil 1020 or 1021) and the magnitude of the resistor 1053. To a lesser extent, damping is controlled by the magnitude of the resistor 1054 and the impedance of the calling line conductors 125.

Resistor 1053 is included in the over-all circuit in order to provide a low impedance path for the flow of the alternating resonant currents of the various resonant circuits, while, at the same time, permitting the decrement of each circuit to be adjusted by its individual resistor (1030 or 1031). The alternating-current voltage drop across resistor 1053 is applied to the calling conductors 125 through resistor 1054. The resistor 1054 has a higher value than resistor 1053 and acts as a decoupling resistor to prevent variations in line impedance from materially affecting either the frequency or the damping constant of any of the resonant circuits as a result of their being shock excited by a step function as described above.

Near the end of the first positive half cycle, at 1119 (see Fig. 2), the applied voltage will fall below the sustaining voltage of tube 1050, thus extinguishing the tube and forcing the oscillatory currents to traverse the damping resistor 1056. This quickly damps them out. The ratchet 206 will be advanced another step during the ensuing negative half cycle to advance brush arms 113 and 114 to terminals 92' and 92, whereupon the above cycle of operations is again repeated. This time, however, the contacts 22 and 22' instead of 21 and 21' are connected in series with the two resonant circuits which represent the second symbol or digit in the called subscriber's number. In a similar manner, damped pulses of alternating current representing each of the digits of the subscriber's designation or number are transmitted successively as the stepping switch moves over concontact groups 91' to 98' and 91 to 98 in a clockwise direction. When the brushes 113 and 114 pass off of the contacts 98' and 98 respectively, no pulses are transmitted for substantially two pulse intervals. This blank interval is employed to synchronize and control the receiving circuits at a distant station or central office in the manner described in Patent 2,658,189 supra.

Then, the complete called subscriber's number or identifying code is repeated so long as the alternating current from source 1055 is applied to the subscriber's line. As a result, the exemplary embodiment of a calling arrangement in accordance with this invention repeatedly transmits pairs of alternating-current pulses having different frequencies representing the various symbols and numerals of the called subscriber's number or identifying code as long as alternating current is applied to the calling subscriber's station over the subscriber's line and so long as the subscriber desires to make such a call. The voltage is removed at the central office when the desired connections are made, thus stopping the generation of signals and leaving the line available for speech or other signals.

It is to be understood that the above-described arrangements are illustrative of the application of the principles of the invention and that numerous other arrangements may be devised by those skilled in the art without departing from the spirit and scope of this invention.

What is claimed is:

1. In a signaling arrangement including a signaling line and a signaling station connected to said line and apparatus at said station capable of generating five damped alternating-current signals of different frequencies and of applying said signals in pairs to said line, said apparatus comprising a first and a second inductor-resistor series circuit commonly terminated at one end, five capacitors, one terminal of each of said capacitors being electrically common, sixteen conductors, eight selector switches each settable to connect the other terminals of any two of said capacitors to a different pair of said conductors associated with each selector switch, a first and a second stepping switch each including a wiper contact and eight step contacts, corresponding step contacts on said first and second stepping switches connected respectively to a first and a second conductor of each pair thereof, said wiper contacts of said first and second stepping switches arranged to make successive contact with said step contacts thereby interconnecting the other end of said respective first and second inductor-resistor series circuits with successive step contacts of said respective stepping switches, stepping means operable for concurrently stepping said wiper contacts to said corresponding step contacts, a source of control voltage of alternating polarity, electromechanical means responsive only to one polarity of said control voltage to operate said stepping means, circuit means responsive only to the opposite polarity of said control voltage to apply to said common electrical capacitor terminals a pulse of electrical energy sufficient to shock excite the series resonant circuits including said first and second inductor-resistor series circuits and the said selected pair of capacitors in series therewith according to the instant step positions of said stepping switches, and decoupling means interconnecting said common terminal of said inductor-resistor series circuits with said signaling line thereby applying said damped signals thereto.

2. In a signaling arrangement including a signaling line and a signaling station connected to said line and apparatus at said station capable of generating a plurality of damped alternating-current signals of different frequencies and of applying said signals in pairs to said line, said apparatus comprising a first and a second inductor-resistor series circuit commonly terminated at one end, a plurality of capacitors greater than two, one terminal of each of said capacitors being electrically common, an even plurality of conductors, a selector switch for each pair of said conductors each settable to connect the other terminals of any two of said capacitors to a different pair of said conductors associated with each selector switch, a first and a second stepping switch each including a wiper contact and a number of step contacts equal to the number of said selector switches, corresponding step contacts on said first and second stepping switches connected respectively to a first and a second conductor of each pair thereof, said wiper contacts of said first and second stepping switches arranged to make successive contact with said step contacts thereby interconnecting the other end of said respective first and second inductor-resistor series circuits with successive step contacts of said respective stepping switches, stepping means operable for concurrently stepping said wiper contacts to said corresponding step contacts, a source of control voltage of alternating polarity, electromechanical means responsive only to one polarity of said control voltage to operate said stepping means, circuit means responsive only to the opposite polarity of said control voltage to apply to said common electrical capacitor terminals a pulse of electrical energy sufficient to shock excite the series resonant circuits including said first and second inductor-resistor series circuits and the said selected pair of capacitors in series therewith according to the instant step positions of said stepping switches, and decoupling means interconnecting said common terminal of said inductor-resistor series circuits with said signaling line thereby applying said damped signals thereto.

3. In a signaling arrangement including a signaling line and a signaling station connected to said line and apparatus at said station capable of generating a plurality of damped alternating-current signals of different frequencies and of applying said signals in combinations to said line, said apparatus comprising a plurality of inductor-resistor series circuits commonly terminated at one end, said plurality of inductor-resistor series circuits equal to the number of said damped signals in combination, a plurality of capacitors greater than the number of said inductor-resistor series circuits, said capacitors selectable in different groups, said groups each containing a number of capacitors equal to the number of said damped signals in combination applied to said line, one terminal of each of said capacitors being electrically common, a plurality of conductors, said conductors combined in fixed groups, said groups each containing a number of different conductors equal to the number of said damped signals in combination applied to said line, a selector switch for each group of said conductors each settable to connect the other terminals of any selected group of said capacitors to a different group of said conductors associated with each selector switch, a plurality of stepping switches equal to the number of said inductor-resistor circuits each switch including a wiper contact and a number of step contacts equal to the number of said selector switches, corresponding step contacts on said stepping switches connected to a different conductor in each group of said plurality of conductors, said wiper contacts of stepping switches arranged to make successive contact with said step contacts thereby interconnecting the other end of said inductor-resistor series circuits with successive step contacts of said respective stepping switches, stepping means operable for concurrently stepping said wiper contacts to said corresponding step contacts, a source of control voltage, control means responsive only at particular times to said control voltage to operate said stepping means, circuit means responsive only at other particular times to said control voltage to apply to said common electrical capacitor terminals a pulse of electrical energy sufficient to shock excite the series resonant circuits including said plurality of inductor-resistor series circuits and the said selected group of capacitors in series therewith according to the instant step positions of said stepping switches, and decoupling means interconnecting said common terminal of said inductor-resistor series circuits with said signaling line thereby applying said damped signals in combination thereto.

4. In a signaling arrangement including a signaling line and a signaling station connected to said line and apparatus at said station capable of generating a plurality of damped alternating-current signals of different frequencies and of applying said signals in combinations to said line, said apparatus comprising a plurality of inductor-resistor series circuits commonly terminated at one end, said plurality of inductor-resistor series circuits equal to the number of said damped signals in combination, a plurality of capacitors greater than the number of said inductor-resistor series circuits, said capacitors selectable in different groups, said groups each containing a number of capacitors equal to the number of said damped signals in combination applied to said line, one terminal of each of said capacitors being electrically common, selecting means operable for preselecting a plurality of said groups of said capacitors for interconnection with said inductor-resistor series circuits to form series resonance circuits in combinations, stepping means operable to assume successively different step positions for successively interconnecting said groups of said capacitors one group at a time with said inductor-resistor series circuits to form said resonance circuits, a source of control voltage, control means responsive only at particular times to said control voltage to operate said stepping means, circuit means responsive only at other particular times to said control voltage to apply to said common electrical capacitor terminals a pulse of electrical energy sufficient to shock excite the series resonant circuits including said plurality of inductor-resistor series circuits and the said selected group of capacitors in series therewith according to the instant step position of said stepping means, and decoupling means interconnecting said common terminal of said inductor-resistor series circuits with said signaling line thereby applying said damped signals in combination thereto.

No references cited.